US011841950B2

(12) United States Patent
Schmidtler et al.

(10) Patent No.: US 11,841,950 B2
(45) Date of Patent: *Dec. 12, 2023

(54) REAL-TIME JAVASCRIPT CLASSIFIER

(71) Applicant: Open Text Inc., Menlo Park, CA (US)

(72) Inventors: Mauritius A. Schmidtler, San Diego, CA (US); Yuanhang Huang, San Diego, CA (US); Chahm An, San Diego, CA (US)

(73) Assignee: OPEN TEXT, INC., Menlo Park, CA (US)

(*) Notice: Subject to any disclaimer, the term of this patent is extended or adjusted under 35 U.S.C. 154(b) by 71 days.

This patent is subject to a terminal disclaimer.

(21) Appl. No.: 17/129,079

(22) Filed: Dec. 21, 2020

(65) Prior Publication Data

US 2021/0110039 A1 Apr. 15, 2021

Related U.S. Application Data

(63) Continuation of application No. 15/884,673, filed on Jan. 31, 2018, now Pat. No. 10,902,124.
(Continued)

(51) Int. Cl.
*H04L 29/06* (2006.01)
*G06F 21/56* (2013.01)
(Continued)

(52) U.S. Cl.
CPC .......... *G06F 21/567* (2013.01); *G06F 21/554* (2013.01); *G06F 21/563* (2013.01);
(Continued)

(58) Field of Classification Search
CPC .... G06F 21/567; G06F 21/554; G06F 21/563; G06F 2221/033; G06F 2221/034;
(Continued)

(56) References Cited

U.S. PATENT DOCUMENTS 8,225,396 B1 * 7/2012 Gauvin ................ G06F 21/606
705/325
9,483,740 B1 11/2016 Ansel
(Continued)

OTHER PUBLICATIONS

Alam et al., "Random Forest Classification for Detecting Android Malware", 2013 IEEE International Conference on Green Computing and Communications and IEEE Internet of Things and IEEE Cyber, Physical and Social Computing, Date of Conference: Aug. 20-23, 2013.*
(Continued)

*Primary Examiner* — Morshed Mehedi
(74) *Attorney, Agent, or Firm* — Sprinkle IP Law Group

(57) ABSTRACT

Aspects of the present disclosure are operable to protect against malicious objects, such as JavaScript code, which may be encountered, downloaded, or otherwise accessed from a content source by a computing system. In an example, antivirus software implementing aspects disclosed herein may be capable of detecting malicious objects in real-time. Aspects of the present disclosure aim to reduce the amount of time used to detect malicious code while maintaining detection accuracy, as detection delays and/or a high false positive rate may result in a negative user experience. Among other benefits, the systems and methods disclosed herein are operable to identify malicious objects encountered by a computing system while maintaining a high detection rate, a low false positive rate, and a high scanning speed.

20 Claims, 5 Drawing Sheets

Related U.S. Application Data

(60) Provisional application No. 62/559,276, filed on Sep. 15, 2017.

(51) Int. Cl.
  *G06F 21/55* (2013.01)
  *H04L 9/40* (2022.01)

(52) U.S. Cl.
  CPC ...... *H04L 63/1408* (2013.01); *H04L 63/1416* (2013.01); *G06F 2221/033* (2013.01); *G06F 2221/034* (2013.01); *H04L 63/0245* (2013.01); *H04L 63/145* (2013.01)

(58) Field of Classification Search
  CPC ............ H04L 63/1408; H04L 63/1416; H04L 63/0245; H04L 63/145
  See application file for complete search history.

(56) References Cited

U.S. PATENT DOCUMENTS

| | | | |
|---|---|---|---|
| 9,690,933 | B1 | 6/2017 | Singh |
| 10,902,124 | B2 | 1/2021 | Schmidtler |
| 2009/0013405 | A1 | 1/2009 | Schipka |
| 2009/0172815 | A1 | 7/2009 | Gu |
| 2010/0186088 | A1* | 7/2010 | Banerjee ................ G06F 21/51 709/224 |
| 2012/0210423 | A1* | 8/2012 | Friedrichs ............. G06F 21/564 726/22 |
| 2012/0227105 | A1* | 9/2012 | Friedrichs .......... H04L 63/1416 726/22 |
| 2013/0111591 | A1 | 5/2013 | Topan |
| 2013/0263272 | A1 | 10/2013 | Banerjee |
| 2013/0291111 | A1* | 10/2013 | Zhou ..................... G06F 21/566 726/23 |
| 2015/0128263 | A1 | 5/2015 | Raugas |
| 2016/0092684 | A1 | 3/2016 | Langton |
| 2016/0147943 | A1 | 5/2016 | Ash |
| 2016/0226890 | A1 | 8/2016 | Harang |
| 2016/0335435 | A1 | 11/2016 | Schmidtler |
| 2017/0083486 | A1* | 3/2017 | van der Horst ..... H04L 63/0281 |
| 2018/0097826 | A1 | 4/2018 | Luan |
| 2018/0314834 | A1 | 11/2018 | Sander |
| 2019/0087574 | A1 | 3/2019 | Schmidtler |

OTHER PUBLICATIONS

Canali et al., "Prophiler: a fast filter for the large-scale detection of malicious web pages", WWW '11: Proceedings of the 20th international conference on World wide web, March (Year: 2011).*

Office Action for U.S. Appl. No. 15/884,673, dated Dec. 10, 2019, 15 pgs.

Office Action for U.S. Appl. No. 15/884,673, dated May 19, 2020, 18 pgs.

Notice of Allowance for U.S. Appl. No. 15/884,673, dated Sep. 21, 2020, 7 pgs.

Raff, Edward, Hash-Grams: Faster N-Gram Features for Classification and Malware Detection, DocEng '18: Proceedings of the ACM Symposium on Document Engineering, Halifax, CA, Aug. 28-31, 2018, 4 pgs.

* cited by examiner

REAL-TIME JAVASCRIPT CLASSIFIER

CROSS-REFERENCE TO RELATED APPLICATION

This application is a continuation of, and claims a benefit of priority to under 35 U.S.C. 120 of U.S. patent application Ser. No. 15/884,673 filed Jan. 31, 2018, issued as U.S. Pat. No. 10,902,124, entitled "Real-Time JavaScript Classifier," which claims a benefit of priority under 35 U.S.C. 119 to U.S. Provisional Application No. 62/559,276 filed on Sep. 15, 2017, entitled "Real-time JavaScript Classifier," which are hereby incorporated herein for all purposes.

BACKGROUND

A computing system may encounter a malicious object from any of a variety of content sources. In some instances, there may be a substantial delay between when the malicious object is encountered and when the malicious object is executed. However, in other instances, there may not be a substantial delay, such that engaging in real-time protection against such malicious objects may be difficult.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Aspects of the present disclosure relate to protecting a computer system from the execution of malicious objects during a web browsing session or when accessing Portable Document Format (PDF) files, among other examples. In examples, systems and methods disclosed herein are operable to protect against malicious objects, such as JavaScript code, which may be encountered, downloaded, or otherwise accessed from a content source by a computing system. In an example, antivirus software implementing aspects disclosed herein may be capable of detecting malicious objects in real-time. Aspects of the present disclosure aim to reduce the amount of time used to detect malicious code while maintaining detection accuracy, as detection delays and/or a high false positive rate may result in a negative user experience. Among other benefits, the systems and methods disclosed herein are operable to identify malicious objects encountered by a computing system while maintaining a high detection rate, a low false positive rate, and a high scanning speed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

Aspects of the present disclosure are operable to detect malicious objects. In one example, a real-time JavaScript classifier may be employed to detect a malicious object in a web page. The classifier may be a semi-static classifier that is operable to deobfuscate JavaScript content to reveal hidden content. The classifier may employ one or more classification features and models designed to achieve high detection rates and low false positive rates. The classifier may be further be optimized to achieve a high scanning speed resulting in real-time protection against malicious objects, including, but not limited to, malicious JavaScript code. Existing methods suffer from low scanning speed, which may increase the risk of an infection prior to detection. In addition, such methods may utilize outdated Machine Learning algorithms, which may result in high error rates and protect against only a subset of JavaScript malware.

Figure 1:
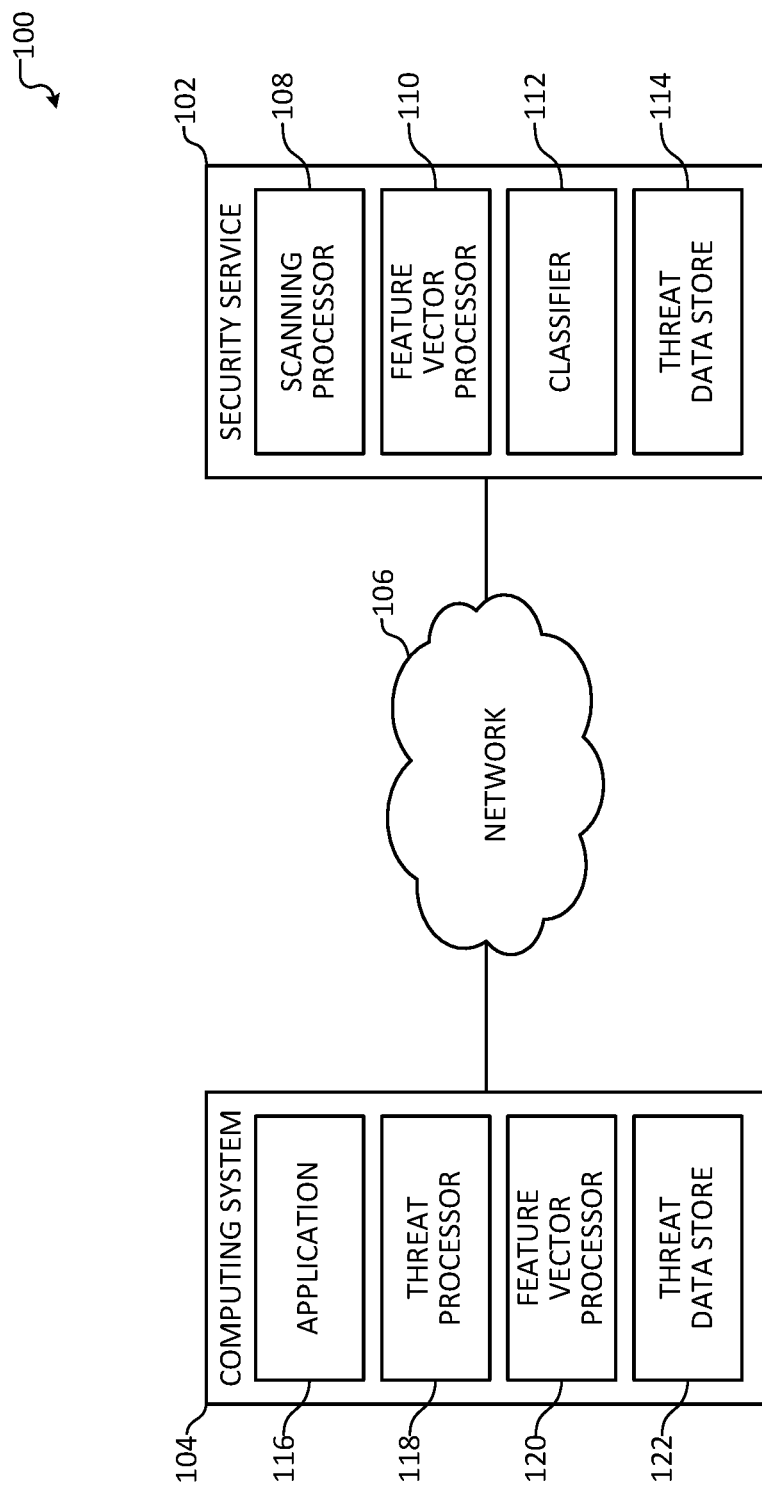
FIG. 1 illustrates an overview of an example system for real-time malicious object classification.

FIG. 1 illustrates an overview of an example system 100 for real-time malicious object classification. As illustrated, system 100 is comprised of security service 102, computing system 104, and network 106. In an example, computing system 104 and security service 102 may communicate with one another using network 106, which may comprise a wired and/or wireless network. While system 100 is discussed with respect to a single computing system and security service, it will be appreciated that any number and/or arrangement of elements may be used without departing from the spirit of this disclosure.

In an example, security service 102 may scan one or more websites and/or other content from a content source in order to classify malicious objects according to aspects disclosed herein. In another example, security service 102 may monitor network traffic of network 106 in order to identify malicious objects as they are communicated across network 106. As illustrated, security service 102 is comprised of scanning processor 108, feature vector processor 110, classifier 112, and threat data store 114. In some examples, security service 102 may be comprised of a computing device, or may be comprised of multiple computing devices. In other examples, the functionality discussed herein with respect to one or more of components 108-114 may be distributed among other devices.

Scanning processor 108 may scan content from one or more content sources to identify malicious objects. In an example, scanning processor 108 may scan websites, document repositories, or other content. In some examples, scanning processor 108 may continuously or occasionally crawl the content sources, in order to update content in threat data store 114. Feature vector processor 110 may be used to generate feature vectors for the content scanned by scanning processor 108, according to aspects disclosed herein.

Feature vectors generated by feature vector processor 110 may be provided to classifier 112, which may classify the scanned content according to one or more models in order to determine whether the scanned content contains a malicious object. In some examples, classifier 112 may return a score associated with the content and/or one or more objects, such that a threshold may be used to determine whether the object is malicious or benign. In examples, classifier 112 may use a model trained based on content sources scanned by scanning processor 108.

In an example, classifier 112 may be trained using a set of content sources known to be benign, and a set of content sources known to be malicious. In addition to using sets of known-benign and known-malicious content sources, the classifier may also utilize unlabeled content sources (e.g., content sources that are not known to be malicious nor known to be benign) to pre-train a training classification model, such as a Deep Neural Net. As an example, benign content may be crawled from known positive content sources, such as, for example, from the Alexa top 1 Million domains (e.g., home pages and sub-URLs), while malicious content may be crawled from malicious content sources obtained from known negative content sources, such as, for example, the Virus Total database. The feature vectors associated with each set of content sources may then be used to classify new content sources, such that new objects may be identified as malicious or benign. As an example, classifier 112 may use a Discriminative Restricted Boltzmann Machine or a Deep Neural Net, among other training classification models. In some examples, the collected data may be rescanned periodically to update the determination with respect to being benign or malicious. It will be appreciated that other techniques may be used to classify objects as malicious or benign without departing from the spirit of this disclosure. Further, while specific categories of "malicious" and "benign" are used herein, it will be appreciated that fewer, additional, and/or alternative categories may be used.

Threat data store 114 may store a whitelist, a blacklist, and/or a list of false positives, wherein the lists stored by threat data store 114 may be used to quickly process content from a content source. As an example, content may be associated with a Uniform Resource Locator (URL), a hash, or a Globally Unique Identifier (GUID), among other identifiers. Accordingly, the identifier associated with the content may be used to determine whether an entry is present in threat data store 114 for the content, such that the content may be quickly identified as blacklisted, whitelisted, or a false positive. If, however, there is no entry present for the content, additional processing may be performed to determine whether the content is associated with or contains any malicious objects. In some examples, the additional processing may comprise executing at least a part of the content in a sandbox and/or performing deobfuscation, among other techniques.

Computing system 104 is illustrated as comprising application 116, threat processor 118, feature vector processor 120, and threat data store 122. In an example, application 116 may be a web browser application used to access webpages during a browsing session. In another example, application 116 may be an application used to open files, such as PDF documents, word processing documents, or spreadsheet documents, among other files. While example applications are discussed herein, it will be appreciated that application 116 may be any of a wide variety of applications, which may be used to access content from a content source.

Threat processor 118 may be used to identify and/or process malicious objects that may be encountered by computing system 104 and, as an example, application 116. In an example, threat processor 118 may be a plugin that integrates with application 116 in order to provide threat protection functionality. In another example, threat processor 118 may be another application the executes on computing system 104. For example, threat processor 118 may monitor network traffic to and from computing system 104 via network 106 in order to identify malicious objects as they are communicated using network 106. It will be appreciated that threat processor 118 may be implemented using any of a variety of other techniques.

In an example, threat processor 118 may evaluate content accessed by application 116 in order to determine whether a malicious object is encountered. In some examples, threat processor 118 may transmit an identifier or other information to security service 102, which may be used by security service 102 to determine whether a malicious object is present. As an example, threat processor 118 may identify JavaScript objects in content accessed by application 116, at least a part of which may be communicated to security service 102. In another example, feature vector processor 120 may generate feature vectors at computing system 104 based on the accessed content, which may then be communicated to security service 102. Security service 102 may provide a score to threat processor 118, or may provide an indication as to whether an object is malicious or benign, among other examples.

In another example, an object may be locally evaluated at computing system 104, thereby reducing the potential for latency to affect the speed with which a malicious object may be identified. For example, threat data store 122 may comprise a whitelist, a blacklist, and/or a list of false positives, similar to those discussed above with respect to threat data store 114. In some examples, the content of threat data store 122 may be at least a subpart of threat data store 114, and may be occasionally updated or synchronized to incorporate newly-identified threats (e.g., as may be identified by scanning processor 108). In other examples, at least a part of a model used by security service 102 may be stored locally at computing system 104. Accordingly, content may be evaluated by threat processor 118 based on threat data store 122. In some examples, threat data store 122 may not contain information relating to the content, such that security service 102 may be used instead to determine whether an object is malicious or benign, as was discussed above. In other examples, a combination of local and remote processing may be used.

Figure 2:
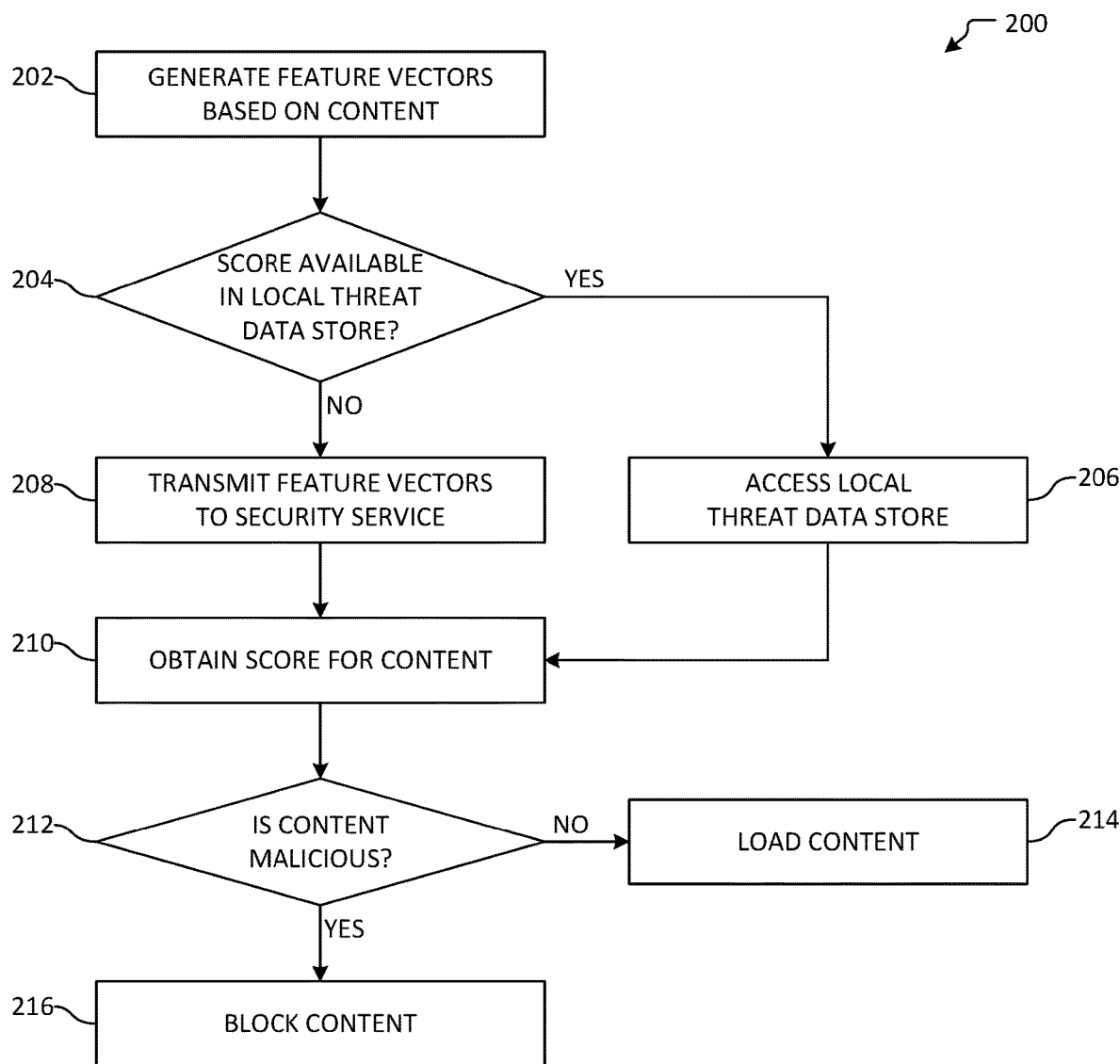
FIG. 2 illustrates an overview of an example method for performing malicious object classification at a computing system.

FIG. 2 illustrates an overview of an example method 200 for performing malicious object classification at a computing system. In an example, method 200 may be performed by a threat processor, such as threat processor 118 in FIG. 1.

Method 200 begins at operation 202, where feature vectors may be generated based on content. In some examples, the content may be a webpage or a PDF document, or may be any other kind of content from a content source. In some examples, generating feature vectors may comprise identifying one or more objects within the content (e.g., JavaScript objects within HTML content, etc.), such that feature vectors may be generated for the identified one or more objects. In an example, feature vectors may be generated using a feature vector processor, such as feature vector processor 110 and/or feature vector processor 120 in FIG. 1. Aspects of feature vector generation are discussed in greater detail below with respect to FIG. 4.

Flow progresses to determination 204, where it may be determined whether a score is available based on a local threat data store. In an example, the local threat data store may be threat data store 122 in FIG. 1. In another example, the determination may comprise determining whether an identifier associated with the content is present in the data store, or may comprise an evaluation of the extracted features, or a combination thereof. If it is determined that a score may be determined locally, flow branches "YES" to operation 206, where the local threat data store may be accessed in order to obtain a score. Flow then continues to operation 210, which is discussed below.

If, however, a score may not be determined locally, flow branches "NO" to operation 208, where at least a part of the generated feature vectors may be transmitted to a security service. In an example, the security service may be security service 102 in FIG. 1. In some examples, other information may be transmitted, including, but not limited to, an identifier associated with the content and/or at least a part of the content.

Moving to operation 210, a score for the content may be obtained. In the example where flow branches "YES" at determination 204, the score may be obtained from a local threat data store. If, however, flow branches "NO" at determination 204, the score may be received from a security service (e.g., via a network, such as network 106 in FIG. 1). In some examples, rather than a score, an indication may be obtained, wherein the indication may indicate whether the content contains any malicious objects.

At determination 212, it may be determined whether the content is malicious. In some examples, the determination may comprise evaluating the score based on a threshold, wherein a score above a threshold may indicate the content is benign, while a score below the threshold may indicate the content is malicious. In other examples, the determination may comprise evaluating an indication, wherein the indication may indicate whether the content is malicious or benign. In an example, the indication may indicate one or more specific subparts of the content are malicious and/or benign. While example techniques are described for determining wither the content is malicious, it will be appreciated that a variety of alternative or additional techniques may be used.

If it is determined that the content is not malicious, flow branches "NO" to operation 214, where the content may be loaded. As an example, the content may be loaded and/or executed by a web browser. In another example, the web browser may have paused execution of at least a part of the content, such that the content may be determined to be malicious or benign prior to continuing execution. It will be appreciated that various techniques for loading content may be applied, some of which may depend on the type of content. Flow terminates at operation 214.

If, however, it is determined that the content is malicious, flow branches "YES" to operation 216, where at least a part of the content may be blocked. In an example, blocking the content may comprise preventing the execution of the content that was identified to be malicious. In another example, an indication may be provided as to the blocked content, such that a user may be made aware that the accessed content contained one or more malicious objects. Flow terminates at operation 216.

Figure 3:
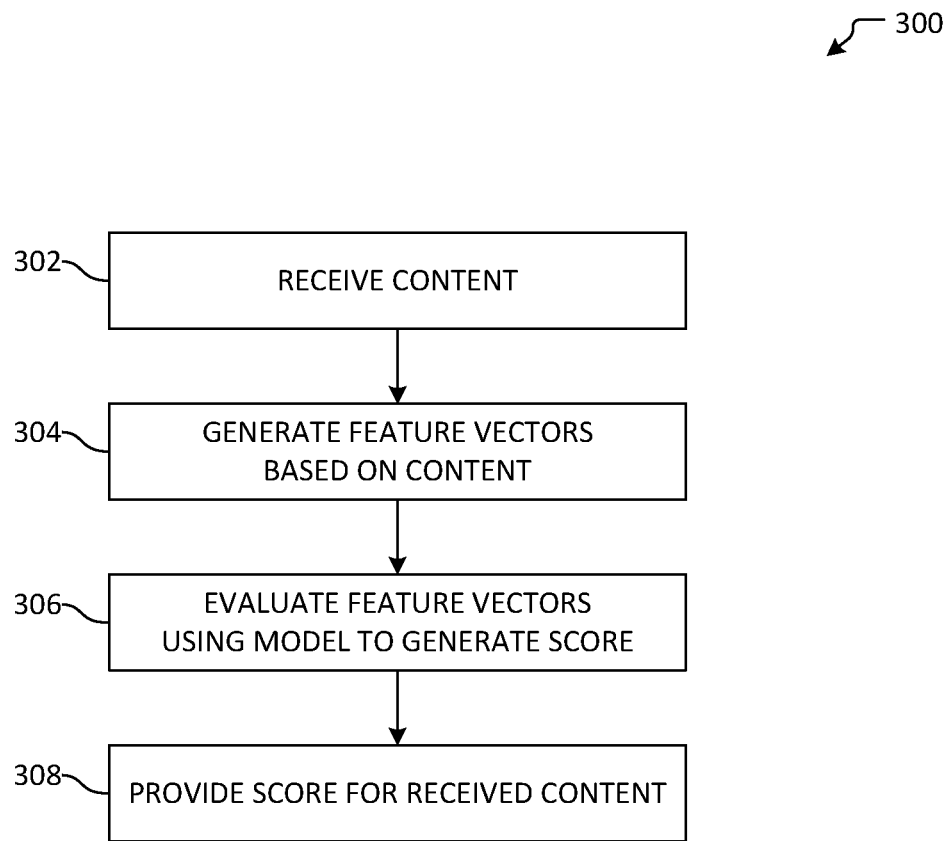
FIG. 3 illustrates an overview of an example method for performing malicious object classification by a security service.

FIG. 3 illustrates an overview of an example method 300 for performing malicious object classification by a security service. In an example, method 300 may be performed as part of a crawl operation, as may be performed by scanning processor 108 in FIG. 1. In another example, method 300 may be performed in response to receiving a request for a score from a threat processor at a computing system, such as threat processor 118 of computing system 104 in FIG. 1.

Method 300 begins at operation 302, where content may be received. In an example, content may be received from a content source as part of a crawl operation. In another example, content may be received from a threat processor. In some examples, the received content may comprise one or more objects, such as JavaScript objects which may be received as part of or associated with HTML content. In other examples, the received content may comprise an identifier associated with the content, such as a URL, which, in some examples, may be used to access the content.

Flow progresses to operation 304, where feature vectors may be generated based on the content. In an example, feature vectors may be generated based on one or more objects within the content, such as one or more JavaScript objects. In some examples, the objects may be evaluated together, or may be evaluated separately, or any combination thereof. In an example, feature vector generation may be performed by a feature vector processor, such as feature vector processor 120 in FIG. 1. In another example, feature vector generation may be performed using one or more operations of method 400, as discussed below with respect to FIG. 4. In other examples, operation 304 may be omitted, and feature vectors may instead be received as part of the received content at operation 302 (e.g., feature vectors may instead be generated by a feature vector processor of a computing system, such as feature vector processor 120 of computing system 104 in FIG. 1).

At operation 306, the generated feature vectors may be evaluated using a model in order to generate a score. In some examples, the model may have been trained using training data associated with content sources known to be benign, and content sources known to be malicious. While method 300 is discussed with respect to a model, it will be appreciated that other techniques may be used. For example, the content may be executed in a sandbox and/or deobfuscated in order to determine whether the content is malicious or benign.

Flow progresses to operation 308, where a score may be provided for the received content. In an example, providing the score may comprise storing the score in a threat data store, such as threat data store 114 in FIG. 1. In such an example, the score may be associated with an identifier or other information, so as to facilitate easy retrieval in the future. Accordingly, it may be possible to retrieve the generated score when the same or similar content is encountered by a computing system in the future, thereby speeding up the identification of malicious objects. In another example, the score may be provided to a threat processor of a computing system, such as threat processor 118 of computing system 104 in FIG. 1. The threat processor may then perform further processing based on the received score, such as the example discussed above in FIG. 2. Flow terminates at operation 308.

Figure 4:
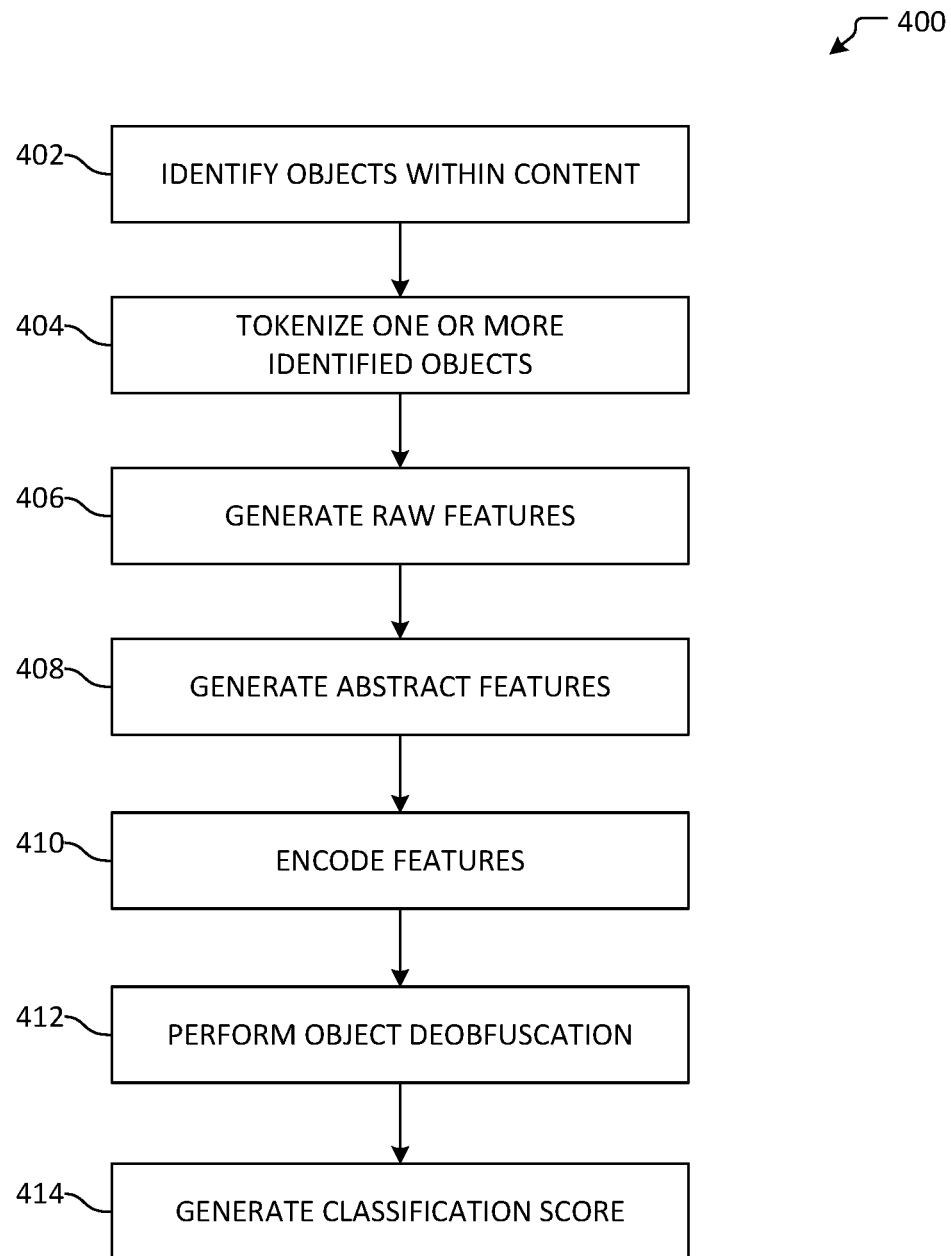
FIG. 4 illustrates an overview of an example method for object classification.

FIG. 4 illustrates an overview of an example method 400 for object classification. The following example illustrates how aspects of the present disclosure may be used to generate feature vectors. In some examples, aspects of method 400 may be performed by a feature vector processor, such as feature vector processor 110 and/or feature vector processor 120 in FIG. 1. Aspects of method 400 may be discussed using the following example of two JavaScript fragments (e.g., objects), which may be included in an HTML, webpage (e.g., content from a content source). However, it will be appreciated that the fragments are provided only as an example, and are not intended to limit the scope of the present disclosure.

---
JavaScript Fragment 1:
--- var x = 1;
var y = 2;
var z = eval(x + y);

---
JavaScript Fragment 2:
---

```
/*@cc_on @*/
/*@
    document.write("JavaScript version: " + @_jscript_version + ".<br />");
    @if (@_win32)
        document.write("Running on the 32-bit version of Windows.");
    @elif (@_win 16)
        document.write("Running on the 16-bit version of Windows.");
    @else
        document.write("Running on a different operating system.");
    @end
@*/
```

Method 400 begins at operation 402, where objects within the content may be identified. In examples, each of the objects may be processed separately, as a whole, or any combination thereof. In an example, to extract feature vector, each object may be considered separately. In another example, while there may be multiple JavaScript objects, an action may be performed only if the objects are executed together. For example, a web browser may allow multiple HTML <script> tags to be used.

At operation 404, one or more of the identified objects may be tokenized. Returning to the example JavaScript fragments above, each fragment may be parsed, such that the JavaScript content may be tokenized. As an example, various token types may be used, including, but not limited to: "Bool," "EOF," "Identifier," "Keyword," "Null," "Numeric," "Punctuator," "String," "RegExp," and "Template."

As an example, tokenizing JavaScript Fragment 1 may yield the following tokens in Table 1.

TABLE 1

| Token Type | Value |
|---|---|
| Keyword | "var" |
| Identifier | "x" |
| Punctuator | "=" |
| Numeric | "1" |
| Punctuator | ";" |
| Keyword | "var" |
| Identifier | "y" |
| Punctuator | "=" |
| Numeric | "2" |
| Punctuator | ";" |
| Keyword | "var" |
| Identifier | "z" |
| Punctuator | "=" |
| Identifier | "eval" |
| Punctuator | "(" |
| Identifier | "x" |
| Punctuator | "+" |
| Identifier | "y" |
| Punctuator | ")" |
| Punctuator | ";" |

Moving to operation 406, raw features may be generated. In some examples, acronyms may be used to represent scopes, token types, punctuators and keywords in order to reduce the feature string length:

Token type: "I" (Identifier), "N" (Numeric), "S" (String), "R" (RegExp)

Scope type: "E" (Exception), "C" (Condition), "L" (Loop), "W" (With), "F" (Function), "T" (Try), "G" (Global).

Punctuators and Keywords: mapped to integers.

With reference to the example JavaScript fragment above, unique token values may be considered, such that each token (e.g., "var", "x", "=", "1", ";", "y", "2", "z", "eval", "(", "+", and ")") may be labeled in order to generate raw features. As an example, "R" may be used to indicate a raw feature, while "G" may indicate a global scope. Accordingly, the resulting labels for the above example may be: "RGvar", "RGx", "RG=", "RG1", "RG;", "RGy", "RG2", "RGz", "RGeval", "RG(", "RG+", and "RG)".

At operation 408, abstract features may be generated in addition to or as an alternative to raw features in order to capture the structural information of an object. For example, instead of parsing JavaScript to obtain an Abstract Syntax Tree for the object, which may be time consuming, a first level of scope may be considered to build abstract n-gram features. Given that the raw features have previously been generated for the tokens at operation 406, generating the abstract features may comprise generating n-grams based on the above raw features. For example, the abstract features may comprise 2-5 grams generated based on the raw features. Returning to the example JavaScript fragment above, example abstract features for "var x=1; var y=2;" are presented in Table 2.

TABLE 2

| Abstract Features | Meaning |
|---|---|
| G:74_G:I_ | Global: var → Global: x |
| G:I_G:35_ | Global: x → Global: = |
| G:74_G:I_G:35_ | Global: var → Global: x → Global: = |
| G:35_G:N_ | Global: = → Global: 1 |
| G:I_G:35_G:N_ | Global: x → Global: = → Global: 1 |
| G:74_G:I_G:35_G:N_ | Global: var_Global: x → Global: = → Global: 1 |
| G:N_G:7_ | Global: 1 → Global: ; |
| G:35_G:N_G:7_ | Global: = → Global: 1 → Global: ; |
| G:I_G:35_G:N_G:7_ | Global: x → Global: = → Global: 1 → Global: ; |
| G:74_G:I_G:35_G:N_G:7_ | Global: var → Global: x → Global: = → Global: 1 → Global: ; |
| G:7_G:74_ | Global: ; → Global: var |
| G:N_G:7_G:74_ | Global: 1 → Global: ; → Global: var |
| G:35_G:N_G:7_G:74_ | Global: = → Global: 1 → Global: ; → Global: var |
| G:I_G:35_G:N_G:7_G:74_ | Global: x → Global: = → Global: 1 → Global: ; → Global: var |
| G:74_G:I_ | Global: var → Global: y |
| G:7_G:74_G:I_ | Global: ; → Global: var → Global: y |
| G:N_G:7_G:74_G:I_ | Global: 1 → Global: ; → Global: var → Global: y |
| G:35_G:N_G:7_G:74_G:I_ | Global: = → Global: 1 → Global: ; → Global: var → Global: y |
| G:I_G:35_ | Global: y → Global: = |
| G:74_G:I_G:35_ | Global: var → Global: y → Global: = |
| G:7_G:74_G:I_G:35_ | Global: ; → Global: var → Global: y → Global: = |
| G:N_G:7_G:74_G:I_G:35_ | Global: 1 → Global: ; → Global: var → Global: y → Global: = |
| G:35_G:N_ | Global: = → Global: 2 |
| G:I_G:35_G:N_ | Global: y → Global: = → Global: 2 |
| G:74_G:I_G:35_G:N_ | Global: var → Global: y → Global: = → Global: 2 |
| G:7_G:74_G:I_G:35_G:N_ | Global: ; → Global: var → Global: y → Global: = → Global: 2 |
| G:N_G:7_ | Global: 2 → Global: ; |
| G:35_G:N_G:7_ | Global: = → Global: 2 → Global: ; |
| G:I_G:35_G:N_G:7_ | Global: y → Global: = → Global: 2 → Global: ; |
| G:74_G:I_G:35_G:N_G:7_ | Global: var → Global: y → Global: = → Global: 2 → Global: ; |

Flow progresses to operation 410, where feature encoding may be performed. As an example, to reduce the size used for labeling features and improve the speed to compute the final scores, a Fowler-Noll-Vo (FNV) hash function may be employed to map from string type to unsigned int. In such an example, as compared to a Murmur hash, FNV hash may be slightly slower with a slightly higher collision rate, but it works both on Windows and Linux platforms. While example hash functions are described, it will be appreciated that any of a variety of hash functions may be used.

At operation 412, deobfuscation may be performed on at least a part of an object in order to reveal hidden information. For example, various techniques exist for obfuscating code in JavaScript (e.g., use of the "eval" function). Accordingly, one or more levels of deobfuscation may be performed, wherein such aspects of an object may undergo additional processing to determine which operations are actually performed. This may improve the accuracy the classifier and help to analyze additional potentially malicious parts of the object.

Flow progresses to operation 414, where a final classification score may be calculated. The equations below are provided as an example for calculating the final classification score. In an example, the final classification score may be the probability of an object being malicious (y=malicious) and benign (y=benign), given the input feature vector x described above. In some examples, the U and W matrices, as well as the c and d vectors may be determined at training time. Flow terminates at operation 414.

$$p(y|\vec{x}) = \frac{e^{d_y} \prod_{j=1}^{n}(e^{c_j+U_{jy}+\Sigma_i W_{ji}x_i})}{\Sigma_y e^{d_y} \prod_{j=1}^{n}(1+e^{c_j+U_{jy}+\Sigma_i W_{ji}x_i})}$$

$$p(y|\vec{x}) = \frac{e^{d_y} \Sigma_{j=1}^{n} \ln(1+e^{c_j+U_{jy}+\Sigma_i W_{ji}x_i})}{\Sigma_y e^{d_y} \Sigma_{j=1}^{n} \ln(1+e^{c_j+U_{jy}+\Sigma_i W_{ji}x_i})}$$

-continued $$p(y|\vec{x}) = \text{softmax}\left(d_y + \sum_{j=1}^{n} \text{softplus}(c_j + U_{jy} + \Sigma_i W_{ji}x_i)\right)$$

It will be appreciated that aspects disclosed herein may also be employed to test objects located on a computing device (as opposed to associated with a content source). Further aspects may also be employed to perform inline detection of malicious objects by monitoring network traffic and, when encountering a header, such as a PDF header, processing the associated content as it is transmitted, such that the content may be extracted for analysis.

Figure 5:
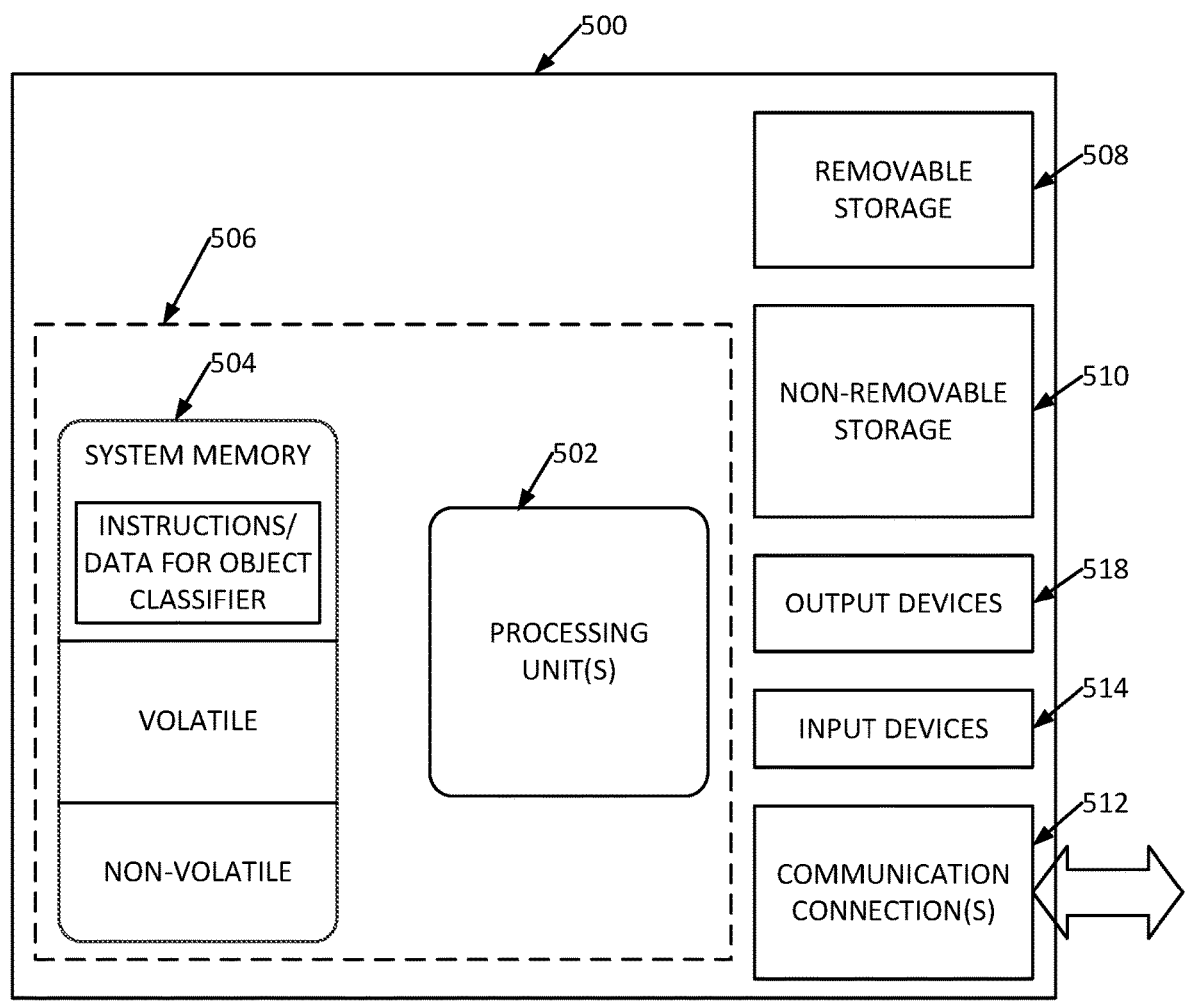
FIG. 5 illustrates one example of a suitable operating environment in which one or more of the present embodiments may be implemented.

FIG. 5 illustrates one example of a suitable operating environment 500 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 500 typically includes at least one processing unit 502 and memory 504. Depending on the exact configuration and type of computing device, memory 504 (storing, among other things, whitelist and/or blacklist information, one or more models, cached information, instructions to perform the methods disclosed herein, etc.) may be volatile (such as RAM), non-volatile (such as ROM, flash memory, etc.), or some combination of the two. This most basic configuration is illustrated in FIG. 5 by dashed line 506. Further, environment 500 may also include storage devices (removable, 508, and/or non-removable, 510) including, but not limited to, magnetic or optical disks or tape. Similarly, environment 500 may also have input device(s) 514 such as keyboard, mouse, pen, voice input, etc. and/or output device(s) 516 such as a display, speakers, printer, etc. Also included in the environment may be one or more communication connections, 512, such as LAN, WAN, point to point, etc.

Operating environment 500 typically includes at least some form of computer readable media. Computer readable media can be any available media that can be accessed by processing unit 502 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 500 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

As will be understood from the foregoing disclosure, one aspect of the technology relates to a system comprising: at least one processor; and memory coupled to the at least one processor, the memory comprising computer executable instructions that, when executed by the at least one processor, performs a method. The method comprises: generating one or more feature vectors based on content; transmitting the one or more feature vectors to a security service; receiving, from the security service, a score associated with the feature vectors; determining, based on the score, whether the content comprises one or more malicious objects; and when it is determined that the content comprises one or more malicious objects, blocking the one or more malicious objects. In an example, generating the one or more feature vectors comprises: identifying one or more objects within the content; tokenizing at least one of the one or more objects to generate a set of tokens; generating a set of raw features based on the set of tokens; and generating a set of abstract features based on the set of raw features. In another example, the method further comprises determining whether a local threat data store is useable to determine a score for the feature vectors. In a further example, the one or more feature vectors are transmitted to the security service when it is determined that the local threat data store is not useable to determine a score for the feature vectors. In yet another example, determining whether the content comprises one or more malicious objects comprises evaluating the received score based on a threshold. In a further still example, transmitting the one or more feature vectors to the security service further comprises transmitting an identifier associated with the content to the security service. In another example, the content is a webpage, and the one or more malicious objects are JavaScript objects.

In another aspect, the technology relates to a computer-implemented method for malicious object classification. The method comprises: receiving one or more feature vectors from a computing system, wherein the feature vectors relate to content from a content source; evaluating, based on a model, the one or more feature vectors to generate a score indicating whether the content comprises one or more malicious objects, wherein the model is trained using a set of content sources known to be benign and a set of content sources known to be malicious; and providing the generated score to the computing system. In an example, receiving one or more feature vectors further comprises receiving an identifier associated with the content. In another example, the method further comprises: determining, based on the identifier, whether a score is available in a threat data store for the content; based on determining that a score is available, accessing the threat data store to retrieve the score for the content; and providing the accessed score to the computing system. In a further example, providing the generated score comprises providing an indication that the content is one of malicious and benign. In yet another example, the method further comprises: crawling one or more content sources from the set of content sources known to be benign and the set of content sources known to be malicious to update the model. In a further still example, crawling the one or more content sources comprises: identifying one or more objects within content from the one or more content sources; tokenizing at least one of the one or more objects to generate a set of tokens; generating a set of raw features based on the set of tokens; and generating a set of abstract features based on the set of raw features.

In a further aspect, the technology relates to a computer-implemented method for performing malicious object classification at a computing system. The method comprises: generating, by the computing system, one or more feature vectors based on content; transmitting the one or more feature vectors to a security service; receiving, from the security service, a score associated with the feature vectors; determining, based on the score, whether the content comprises one or more malicious objects; and based on determining that the content comprises one or more malicious objects, blocking the one or more malicious objects. In an example, generating the one or more feature vectors comprises: identifying one or more objects within the content; tokenizing at least one of the one or more objects to generate a set of tokens; generating a set of raw features based on the set of tokens; and generating a set of abstract features based on the set of raw features. In another example, the method further comprises determining whether a threat data store local to the computing system is useable to determine a score for the feature vectors. In a further example, the one or more feature vectors are transmitted to the security service when it is determined that the local threat data store is not useable to determine a score for the feature vectors. In yet another example, determining whether the content comprises one or more malicious objects comprises evaluating the received score based on a threshold. In a further still example, transmitting the one or more feature vectors to the security service further comprises transmitting an identifier associated with the content to the security service. In another example, the content is a webpage, and the one or more malicious objects are JavaScript objects.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A computer-implemented method for malicious object classification, comprising:
    receiving content from a threat processor, the content comprising one or more objects associated with HTML content;
    generating one or more feature vectors based on the received content;
    providing a classification model trained using a set of content sources known to be benign and a set of content sources known to be malicious; and
    evaluating, using the classification model, the one or more feature vectors to generate a score indicating whether the content comprises one or more malicious objects.

2. The computer-implemented method of claim 1, further comprising providing the generated score to a computing system.

3. The computer-implemented method of claim 2, wherein providing the generated score comprises providing an indication that the content is one of malicious and benign.

4. The computer-implemented method of claim 1, wherein receiving content further comprises receiving an identifier associated with the content.

5. The computer-implemented method of claim 4, further comprising:
    determining, based on the identifier, whether a score is available in a threat data store for the content;
    based on determining that a score is available, accessing the threat data store to retrieve the score for the content; and
    providing the score to a computing system.

6. The computer-implemented method of claim 1, further comprising:
    crawling one or more content sources from a set of content sources known to be benign and a set of content sources known to be malicious to update the classification model.

7. The computer-implemented method of claim 6, wherein crawling the one or more content sources comprises:
    identifying one or more objects within content from the one or more content sources;
    tokenizing at least one of the one or more objects identified from within the content from the one or more content sources to generate a set of tokens;
    generating a set of raw features based on the set of tokens; and
    generating a set of abstract features based on the set of raw features.

8. A system comprising:
    at least one processor; and
    memory coupled to the at least one processor, the memory comprising computer executable instructions that, when executed by the at least one processor, performs a method comprising:
    receiving content from a threat processor, the content comprising one or more objects associated with HTML content;
    generating one or more feature vectors based on the received content;
    transmitting the one or more feature vectors to a security service;
    receiving, from the security service, a score associated with the feature vectors, the score based on an evaluation of the one or more feature vectors by a classification model;
    determining, based on the score, whether the content comprises one or more malicious objects; and
    when it is determined that the content comprises one or more malicious objects, blocking the one or more malicious objects.

9. The system of claim 8, wherein generating the one or more feature vectors comprises:
    identifying the one or more objects within the content;
    tokenizing at least one of the one or more objects identified from within the content to generate a set of tokens;
    generating a set of raw features based on the set of tokens; and
    generating a set of abstract features based on the set of raw features.

10. The system of claim 9, wherein the method further comprises determining whether a local threat data store is useable to determine a score for the feature vectors.

11. The system of claim 10, wherein the one or more feature vectors are transmitted to the security service when it is determined that the local threat data store is not useable to determine a score for the feature vectors.

12. The system of claim 8, wherein determining whether the content comprises one or more malicious objects comprises evaluating the received score based on a threshold.

13. The system of claim 8, wherein transmitting the one or more feature vectors to the security service further comprises transmitting an identifier associated with the content to the security service.

14. The system of claim 8, wherein the content is a webpage, and wherein the one or more malicious objects are JavaScript objects.

15. A computer-implemented method for performing malicious object classification at a computing system, comprising:
   generating, by the computing system, one or more feature vectors based on content;
   transmitting the one or more feature vectors to a security service;
   receiving, from the security service, a score associated with the feature vectors, the score based on an evaluation of the one or more feature vectors by a classification model;
   determining, based on the score, whether the content comprises one or more malicious objects; and
   based on determining that the content comprises one or more malicious objects, blocking the one or more malicious objects.

16. The computer-implemented method of claim 15, wherein generating the one or more feature vectors comprises:
   identifying one or more objects within the content;
   tokenizing at least one of the one or more objects to generate a set of tokens;
   generating a set of raw features based on the set of tokens; and
   generating a set of abstract features based on the set of raw features.

17. The computer-implemented method of claim 15, wherein the method further comprises determining whether a threat data store local to the computing system is useable to determine a score for the feature vectors.

18. The computer-implemented method of claim 17, wherein the one or more feature vectors are transmitted to the security service when it is determined that the threat data store is not useable to determine a score for the feature vectors.

19. The computer-implemented method of claim 15, wherein determining whether the content comprises one or more malicious objects comprises evaluating the received score based on a threshold.

20. The computer-implemented method of claim 15, wherein the content is a webpage, and wherein the one or more malicious objects are JavaScript objects.

\* \* \* \* \*